(12) United States Patent
Bogner et al.

(10) Patent No.: US 10,986,019 B2
(45) Date of Patent: Apr. 20, 2021

(54) IP ADDRESS AND ROUTING SCHEMES FOR OVERLAY NETWORK

(71) Applicant: Proofpoint, Inc., Sunnyvale, CA (US)

(72) Inventors: Etay Bogner, Tel Aviv (IL); Eduardo Warszawski, Kfar Saba (IL)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 15/968,762

(22) Filed: May 2, 2018

(65) Prior Publication Data

US 2018/0331950 A1     Nov. 15, 2018

Related U.S. Application Data

(60) Provisional application No. 62/503,349, filed on May 9, 2017, provisional application No. 62/503,346, filed
(Continued)

(51) Int. Cl.
*H04L 12/715*     (2013.01)
*H04L 12/28*     (2006.01)
*H04L 29/08*     (2006.01)

(52) U.S. Cl.
CPC .......... *H04L 45/64* (2013.01); *H04L 12/2854* (2013.01); *H04L 67/141* (2013.01); *H04L 69/325* (2013.01)

(58) Field of Classification Search
CPC ....... H04L 9/0833; H04L 43/50; H04L 45/22; H04L 63/103; H04L 12/2854; H04L 45/64; H04L 67/141; H04L 69/325
See application file for complete search history.

(56) References Cited

U.S. PATENT DOCUMENTS 7,328,237 B1 *  2/2008  Thubert ............ H04L 29/12783
                                                    370/392
10,462,045 B1   10/2019 Francois et al.
(Continued)

FOREIGN PATENT DOCUMENTS

WO      2008006041 A2     1/2008

OTHER PUBLICATIONS

EP Application 18170415.6 European Search Report dated Oct. 22, 2018.
(Continued)

*Primary Examiner* — Michael Thier
*Assistant Examiner* — Prince A Mensah
(74) *Attorney, Agent, or Firm* — Banner & Witcoff, Ltd.

(57) ABSTRACT

A communication system includes multiple Point-of-Presence (POP) interfaces distributed in a Wide-Area Network (WAN), and one or more processors coupled to the POP interfaces. The processors are configured to assign to an initiator in the communication system a client Internet Protocol (IP) address, including embedding in the client IP address an affiliation of the initiator with a group of initiators, to assign to a responder in the communication system a service IP address, including embedding in the service IP address an affiliation of the service with a group of responders, and to route traffic between the initiator and the responder, over the WAN via one or more of the POP interfaces, in a stateless manner, based on the affiliation of the initiator and the affiliation of the service, as embedded in the client and service IP addresses.

14 Claims, 4 Drawing Sheets

100

| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|---|---|---|---|---|---|---|---|---|---|---|---|---|---|---|---|---|
| OVERLAY PREFIX |||||||||||||||||||||||||||||| R | R | R |
| ASID |||||||||||| R | R | TID ||||||||||
| TID (cont.) |||| R | R | MGI |||||||| MGR |||||| R | R |
| R | NETID ||||| OPID ||||||||||||||||||||||||

Related U.S. Application Data on May 9, 2017, provisional application No. 62/503,354, filed on May 9, 2017, provisional application No. 62/503,357, filed on May 9, 2017.

(56) References Cited

U.S. PATENT DOCUMENTS

| | | |
|---|---|---|
| 2004/0019781 A1 | 1/2004 | Chari et al. |
| 2004/0205247 A1* | 10/2004 | Ahn .................. H04L 29/12009 709/245 |
| 2006/0236370 A1* | 10/2006 | John ...................... H04L 63/102 726/1 |
| 2008/0008179 A1 | 1/2008 | Chen et al. |
| 2008/0320303 A1* | 12/2008 | Khalid .................. H04L 9/0833 713/163 |
| 2009/0122798 A1 | 5/2009 | Iwai |
| 2010/0002700 A1 | 1/2010 | Simpson, Jr. |
| 2011/0107004 A1 | 5/2011 | Maitra |
| 2011/0110378 A1* | 5/2011 | Savolainen ........... H04W 76/15 370/400 |
| 2012/0179796 A1* | 7/2012 | Nagaraj .................. H04L 45/22 709/223 |
| 2013/0254365 A1 | 9/2013 | Gupta et al. |
| 2015/0256456 A1 | 9/2015 | Previdi et al. |
| 2016/0028625 A1 | 1/2016 | Hari et al. |
| 2016/0366051 A1 | 12/2016 | Chen et al. |
| 2017/0171232 A1 | 6/2017 | Graham-Cumming |

OTHER PUBLICATIONS

European Application # 18170415.6 search report dated Oct. 22, 2018.
European Application # 18169986.9 search report dated Oct. 16, 2018.
Herbert., "Identifier-locator addressing for network virtualization draft-herbert-nvo3-ila-00", Intended Status: Experimental Google, Internet-Draft, 31 pages, Jan. 20, 2015.
Carpenter., "Architectural Principles of the Internet", Request for Comments: 1958, 8 pages, Jun. 1996.
Deering et al., "Internet Protocol, Version 6 (IPv6)", Request for Comments: 2460, 39 pages, Dec. 1998.
Meyer et al., "Report from the IAB Workshop on Routing and Addressing", Request for Comments: 4984, 39 pages, Sep. 2007.
Atkinson et al., "Identifier-Locator Network Protocol (ILNP) Architectural Description", Request for Comments: 6740, 53 pages, Nov. 2012.
Bogner et al., U.S. Appl. No. 15/647,309, filed Jul. 12, 2017.
U.S. Appl. No. 15/647,309 office action dated Jun. 20, 2019.
Oct. 16, 2018 (EP) Search Report—App. 18169986.9.
May 20, 2019 U.S. Non-Final Office Action—U.S. Appl. No. 15/968,762.
Jan. 24, 2020 U.S. Final Office Action—U.S. Appl. No. 15/647,309.
Jun. 20, 2019 U.S. Non-Final Office Action—U.S. Appl. No. 15/647,309.
Jun. 2, 2020 U.S. Non-Final Office Action—U.S. Appl. No. 15/647,309.

* cited by examiner

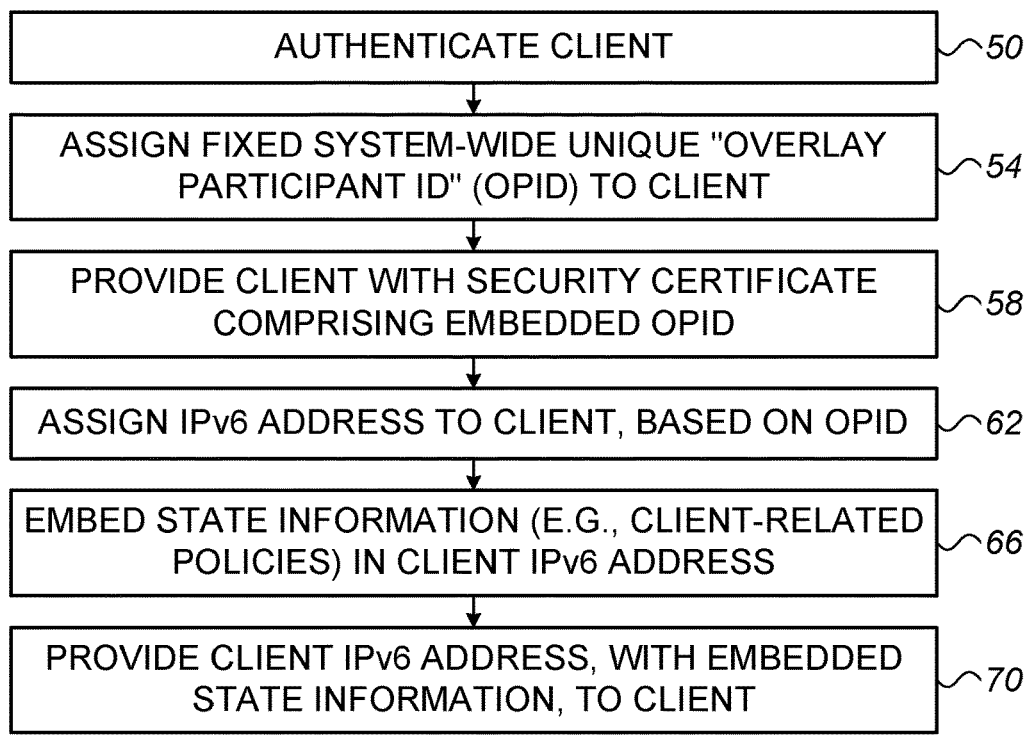
FIG. 2
FIG. 3
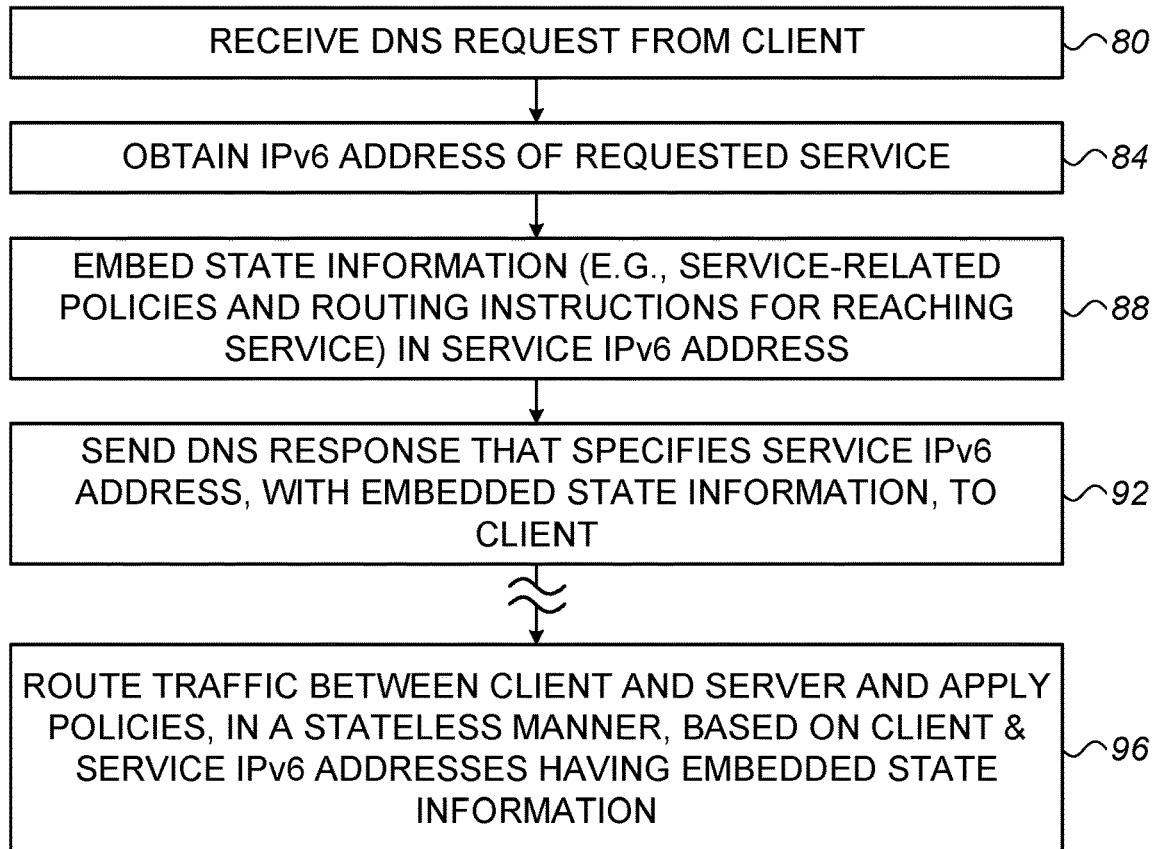

IP ADDRESS AND ROUTING SCHEMES FOR OVERLAY NETWORK

CROSS-REFERENCE TO RELATED APPLICATIONS

This application claims the benefit of U.S. Provisional Patent Application 62/503,346, U.S. Provisional Patent Application 62/503,349, U.S. Provisional Patent Application 62/503,354, and U.S. Provisional Patent Application 62/503,357, all filed May 9, 2017, whose disclosures are incorporated herein by reference.

FIELD OF THE INVENTION

The present invention relates generally to network communication, and particularly to overlay networks.

BACKGROUND OF THE INVENTION

Various applications and use-cases call for secure communication over public and/or wide-area networks, such as over the Internet. One example use-case is communication among employees of a globally-distributed enterprise. Some existing solutions employ Virtual Private Networks (VPNs), or application-level protocols such as Hypertext Transfer Protocol—Secure (HTTPS).

SUMMARY OF THE INVENTION

An embodiment of the present invention that is described herein provides a communication system including multiple Point-of-Presence (POP) interfaces distributed in a Wide-Area Network (WAN), and one or more processors coupled to the POP interfaces. The processors are configured to assign to an initiator in the communication system a client Internet Protocol (IP) address, including embedding in the client IP address an affiliation of the initiator with a group of initiators, to assign to a responder in the communication system a service IP address, including embedding in the service IP address an affiliation of the service with a group of responders, and to route traffic between the initiator and the responder, over the WAN via one or more of the POP interfaces, in a stateless manner, based on the affiliation of the initiator and the affiliation of the service, as embedded in the client and service IP addresses.

In some embodiments, the processors are configured to receive a packet, which is exchanged between the initiator and the responder and includes the client IP address and the service IP address, and to enforce a security policy on the packet depending on the affiliation of the initiator and the affiliation of the service, as embedded in the client and service IP addresses. In an embodiment, the processors are configured to embed in the client IP address an Initiator Meta-Group ID (MGI) value indicative of the affiliation of the initiator, and to embed in the service IP address a Responder Meta-Group ID (MGR) value indicative of the affiliation of the responder, and to enforce the security policy by applying one or more stateless logical operations to the MGI of the initiator and to the MGR of the service, as embedded in the packet.

There is additionally provided, in accordance with an embodiment of the present invention, a communication system including multiple Point-of-Presence (POP) interfaces distributed in a Wide-Area Network (WAN), and one or more processors coupled to the POP interfaces. The processors are configured to assign to clients in the communication system respective client Internet Protocol (IP) addresses, including embedding in the client IP addresses respective Tenant IDs (TIDs) that are indicative of an affiliation of the clients with one or more tenants served by the communication system, and to route traffic of the clients, over the WAN via one or more of the POP interfaces, in a stateless manner, based on the affiliation of the clients with the tenants, as embedded in the client IP addresses.

In some embodiments, for a given POP interface corresponding to a given geographical location, routing of the traffic is performed by a plurality of access servers, and the processors are configured to assign the traffic of each of the tenants to a respective subset comprising one or more of the access servers. In an embodiment, for a peer POP interface corresponding to another geographical location, routing of the traffic is performed by a peer plurality of access servers, and the processors are configured to provision, for routing the traffic between the given POP interface and the peer POP interface, a set of inter-POP connections that is sparser than a full mesh between pairs of the access servers in the plurality and in the peer plurality. In an embodiment, the processors are configured to receive packets, which are exchanged by the clients, and to enforce a security policy on the packets depending on affiliations of the clients with the tenants, as embedded in the client and service IP addresses.

There is also provided, in accordance with an embodiment of the present invention, a communication system including multiple Point-of-Presence (POP) interfaces distributed in a Wide-Area Network (WAN), and one or more processors coupled to the POP interfaces. The processors are configured to assign to clients in the communication system respective client IP addresses, including embedding in the client IP addresses respective Access Server IDs (ASIDs) that are indicative of access servers that are to serve the clients, to assign to servers in the communication system respective service Internet Protocol (IP) addresses, including embedding in the service IP addresses respective ASIDs that are indicative of the access servers that serve the servers, and to route traffic, which is exchanged over the WAN between the clients and the servers, via one or more of the POP interfaces in a stateless manner, based on the ASIDs embedded in the client IP addresses and the service IP addresses. In an embodiment, the processors are configured to receive a packet at a given POP interface, and to route the packet to another POP interface by selecting for the packet an inter-POP connection depending on the ASIDs.

There is further provided, in accordance with an embodiment of the present invention, a communication method including, using one or more processors that are coupled to multiple Point-of-Presence (POP) interfaces distributed in a Wide-Area Network (WAN), assigning to an initiator a client Internet Protocol (IP) address, including embedding in the client IP address an affiliation of the initiator with a group of initiators. A service IP address is assigned to a responder, including embedding in the service IP address an affiliation of the service with a group of responders. Traffic is routed between the initiator and the responder, over the WAN via one or more of the POP interfaces, in a stateless manner, based on the affiliation of the initiator and the affiliation of the service, as embedded in the client and service IP addresses.

There is additionally provided, in accordance with an embodiment of the present invention, a communication method including, using one or more processors that are coupled to multiple Point-of-Presence (POP) interfaces distributed in a Wide-Area Network (WAN), assigning to clients respective client Internet Protocol (IP) addresses, including embedding in the client IP addresses respective Tenant IDs (TIDs) that are indicative of an affiliation of the clients with one or more tenants served by the communication system. Traffic of the clients is routed, over the WAN via one or more of the POP interfaces, in a stateless manner, based on the affiliation of the clients with the tenants, as embedded in the client IP addresses.

There is additionally provided, in accordance with an embodiment of the present invention, a communication method including, using one or more processors that are coupled to multiple Point-of-Presence (POP) interfaces distributed in a Wide-Area Network (WAN), assigning to clients respective client IP addresses, including embedding in the client IP addresses respective Access Server IDs (ASIDs) that are indicative of access servers that are to serve the clients. Respective service Internet Protocol (IP) addresses are assigned to servers, including embedding in the service IP addresses respective ASIDs that are indicative of the access servers that serve the servers. Traffic, which is exchanged over the WAN between the clients and the servers, is routed via one or more of the POP interfaces in a stateless manner, based on the ASIDs embedded in the client IP addresses and the service IP addresses.

The present invention will be more fully understood from the following detailed description of the embodiments thereof, taken together with the drawings in which:

BRIEF DESCRIPTION OF THE DRAWINGS

FIG. 2 is a flow chart that schematically illustrates a method for initial client set-up in the overlay network of FIG. 1, in accordance with an embodiment of the present invention;

FIG. 3 is a flow chart that schematically illustrates a method for communication in the overlay network of FIG. 1, in accordance with an embodiment of the present invention;

DETAILED DESCRIPTION OF EMBODIMENTS

Overview

Figure 1:
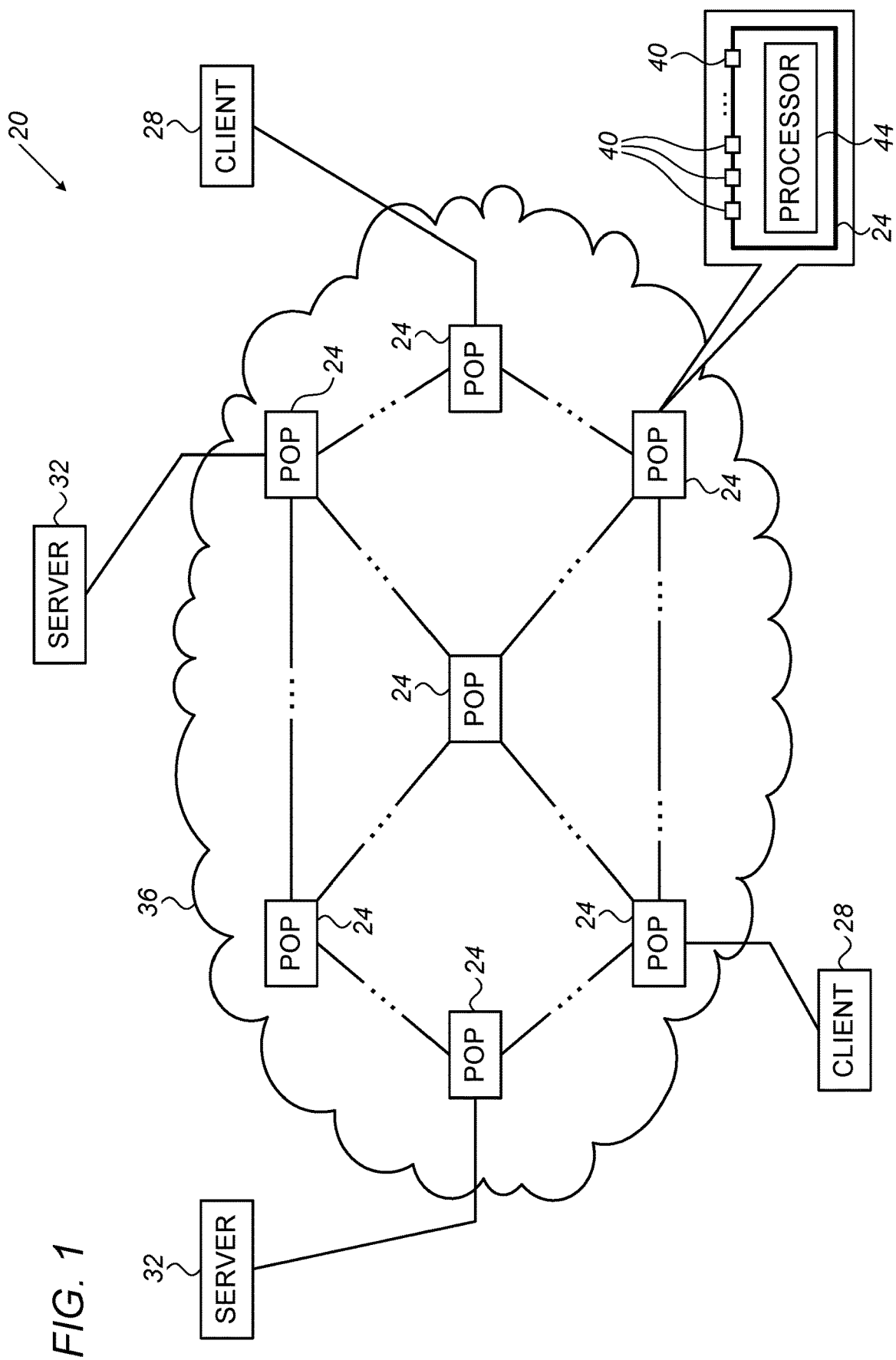
FIG. 1 is a block diagram that schematically illustrates an Internet-wide secure overlay network, in accordance with an embodiment of the present invention.

Embodiments of the present invention that are described herein provide improved methods and systems for implementing an overlay network over a Wide-Area Network (WAN), e.g., over the Internet. Such an overlay network can be used, for example, for connecting globally-distributed employees of an organization.

In some disclosed embodiments, an overlay network is implemented using multiple Point-of-Presence (POP) interfaces distributed across the WAN, and one or more processors. Among other tasks, the processors assign client Internet Protocol (IP) addresses to the clients of the overlay networks, and service IP addresses to servers that provide services to the clients.

As will be described in detail below, the processors typically embed in the assigned IP addresses state information, which enables stateless processing of the traffic exchanged between the clients and the servers. The embedded state information enables, for example, stateless routing of the traffic, and/or stateless enforcement of policies. Typically, the processors also embed in the client IP addresses unique client identities, which are later used in processing of client traffic, e.g., in enforcing policies. The processors typically assign IPv6 addresses, which comprise a sufficient number of spare bits for embedding the additional state information and identities.

In an example embodiment, the state information embedded by the processors in the IP addresses comprises parameters such as an Access Server ID (ASID) that serves the client or service, a Tenant ID (TID) indicative of the affiliation of the client with a tenant from among multiple tenants served by the overlay network, and an affiliation of the client or service with initiator and responder meta-groups. Example techniques for efficient, stateless routing and enforcing of policies using this information are explained in detail herein.

Since the disclosed techniques enable stateless routing and stateless enforcing of policies, the various network elements are not required to make complex switching decisions and/or hold large data structures. Moreover, the disclosed techniques do not require installation of any dedicated drivers or other software on the clients and servers, and typically use existing IP security (IPSec) clients. As such, the disclosed solution is highly efficient, scalable and easy to deploy.

Moreover, in the disclosed embodiments the processors are typically not involved in the on-going data-plane operations of the overlay network, but rather in control-plane management. As such, the processors are not required to meet strict latency or processing-power requirements, and in particular do not necessarily have to be collocated with the POP interfaces. This capability, too, makes the disclosed overlay networks highly flexible, scalable and cost-effective.

In addition, since users typically connect to the nearest POP interface, rather than to a geographically remote gateway, user experience in enhanced as well.

System Description

FIG. 1 is a block diagram that schematically illustrates an Internet-wide secure overlay system 20 (also referred to as overlay network), in accordance with an embodiment of the present invention. System 20 enables multiple clients 28 to consume services provided by one or more servers 32, across a Wide-Area Network (WAN) 36.

In one example embodiment, WAN 36 comprises the Internet, and clients 28 are used by employees of an organization who distributed worldwide. Multi-tenant systems, in which clients 28 belong to multiple different organizations, can also be implemented in a similar manner. Other use cases may comprise enabling non-employees (e.g., contractors) to access internal organization resources in a controlled manner, and/or connecting branch offices of an organization. More generally, system 20 enables users to gain access and services from multiple locations simultaneously, without a need to switch between Virtual Private Network (VPN) profiles or connect to different VPN gateways. Generally, systems such as system 20 can be used over any suitable WAN for any other suitable purpose.

Clients 28 may comprise any suitable wireless or wireline devices, such as, for example, laptop or tablet computers, desktop personal computers, cellular phones or smartphones, or any other suitable type of user devices that are capable of communicating over a network. Clients 28 may connect to WAN 36 in any suitable way, e.g., via a wireless and/or wireline access network.

Servers 32 may comprise any suitable computing platforms that are configured to provide services to clients 28. Several non-limiting examples of types of servers 32 comprise Web portals, Customer Relationship Management (CRM) systems, development systems, private cloud systems that host Virtual Machines (VMs), and file servers, to name just a few examples.

System 20 comprises multiple Point-of-Presence (POP) nodes 24 distributed over WAN 36. POP nodes 24 collectively implement a secure overlay network using methods that are described in detail below. In the present example, each POP node 24 comprises multiple ports 40 and a processor 44. Ports 40 are also referred to as "POP interfaces." Each port 40 typically comprises suitable physical circuitry for interfacing with a network link of WAN 36 or with a client 28, one or more memory buffers for buffering incoming and/or outgoing packets, and/or other suitable circuitry.

The configurations of system 20 and its various elements, e.g., POP nodes 24, shown in FIG. 1, are example configurations that are chosen purely for the sake of conceptual clarity. In alternative embodiments, any other suitable configurations can be used. For example, in the example embodiment of FIG. 1 each POP node 24 comprises a single processor 44 that is collocated with POP interfaces 40 of that POP node. Alternatively, however, some or even all of processors 44 need not necessarily be collocated with any of POP interfaces 40. Thus, a given POP node 24 may comprise any suitable number of processors 44, and some processors 44 may be located away from POP nodes 24. The description that follows refers to a certain "division of labor" among the various processors 44. This partitioning of tasks, however, is depicted purely by way of example. Alternatively, any other task partitioning can be used.

In various embodiments, POP nodes 24 may be implemented using suitable software, using suitable hardware, e.g., using one or more Application-Specific Integrated Circuits (ASICs) or Field-Programmable Gate Arrays (FPGAs), or using a combination of hardware and software elements. In some embodiments, processors 44 comprise one or more programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Communication Using Internet-Wide Secure Overlay Network

In some embodiments, processors 44 of POP nodes 24 jointly implement an overlay network for clients 28. In some embodiments, processors 44 assign IPv6 addresses to clients 28 and to servers 32. Typically, a client IP address is assigned when the client initially set-up in system 20. A server IP address (also referred to as a service IP address) is typically assigned when a client requests to access the respective server (to use the respective service). In some embodiments, state information such as policies and routing instructions are embedded in the client and service IP addresses. Network elements in WAN 36 thus do not need to retain any state information regarding connections, clients and servers. Rather, network elements are able to route traffic and apply policies in a fully stateless manner, based only on the information embedded in the packets they process.

The two flow charts below illustrate example flows of the disclosed techniques. FIG. 2 describes the flow in the "underlay" network, typically the public Internet. FIG. 3 describes the flow in the "overlay" network implemented over this underlay network.

FIG. 2 is a flow chart that schematically illustrates a method for initial set-up of a new client 28 in system 20, in accordance with an embodiment of the present invention. The method begins with processors 44 of system 20 authenticating the client, at an authentication step 50. Authentication can be performed by processor 44 of the POP node 24 that is nearest to the client (or alternatively by any other processor 44).

As part of a process of provisioning the client, processor 44 assigns the new client 28 a security certificate. The specific security features and details of certificate assignment are considered outside the scope of the present disclosure.

In some embodiments, processor 44 embeds in the security certificate a unique "Overlay Participant Identity" (OPID), at an identity assignment step 54. The OPID is a fixed identifier that is unique across the entire system 20. At a certificate & ID provisioning step 58, processor 44 sends the certificate, with the OPID embedded therein, to the client 28.

At a client IP assignment step 62, processor 44 assigns an IPv6 IP address to the client 28 in question. Processor 44 selects the client IP address based on the OPID of the client, which is embedded in the client's security certificate. (In an embodiment, during authentication the client shares the security certificate with a VPN gateway running on processor 44. Processor 44 extracts the OPID from the certificate and issues the client IP address based on the OPID.)

In addition, processor 44 embeds state information in the client IP address, at a state embedding step 66. In accordance with IPv6, the client IP address is a 128-bit address having multiple spare bits. Processor 44 typically embeds the state information in some of these spare bits.

In various embodiments, processor 44 may embed various types of state information in the client IP address. For example, the state information may comprise a definition of one or more policies applicable to the client 28. One example type of policy is a security policy, e.g., a policy that specifies access privileges of the client 28. Another example type of policy is a Quality-of-Service (QoS) policy, e.g., a policy that specifies a priority level, a guaranteed bandwidth, or any other suitable QoS parameters applicable to the client 28.

Additionally or alternatively, processor 44 may embed any other suitable policy definition, e.g., routing policies, and/or any other suitable type of state information, in the IP address it assigns to client 28. At a client IP provisioning step 70, processor 44 provides the assigned IP address to the client.

Typically, client 28 will use its client IP address (which was assigned as described above) as the source IP address in any subsequent packet it will send. Any POP node 24 receiving such a packet will be able to extract (i) the client OPID and (ii) the associated client-related policies from the IP address of the packet. Therefore, any POP node 24 is able to apply the correct policies to such packets in a fully stateless manner, without a need for complex data structures, rule engines and the like.

FIG. 3 is a flow chart that schematically illustrates a method for communication in overlay system 20, in accordance with an embodiment of the present invention. The process typically begins with the client connecting to the VPN gateway using the IPSec VPN, including authenticating using the certificate. This initial stage corresponds to the "underlay" network. The figure illustrates the subsequent process implemented as part of the "overlay" network, from the moment client 28 requests to access a Domain Name (e.g., Uniform Resource Locator—URL) of a requested service, until client 28 and the appropriate server 32 communicate via the overlay network.

The method begins with processors 44 receiving a Domain Name System (DNS) request from client 28, at a DNS request reception step 80. The DNS request is typically received and handled by processor 44 of the POP node 24 that is nearest to client 28. Typically, when system 20 serves multiple tenants (e.g., groups of clients belonging to different organizations), each tenant (e.g., organization) has a separate DNS system and/or DNS namespace, and DNS requests are handled separately per tenant.

In the DNS request, client 28 typically specifies the Domain Name of the service it requests to consume. At a DNS resolution step 84, processor 44 resolves the Domain Name specified in the DNS request, i.e., translates the Domain Name into an IPv6-compliant IP address of a server 32 that provides the requested service. This IP address is referred to herein as a service IP address. The translation may be performed, for example, by querying a DNS server external to system 20, or in any other suitable way.

At a state information embedding step 88, processor 44 embeds state information in the service IP address. Any suitable state information can be embedded at this stage. For example, the state information may comprise a definition of one or more policies applicable to the service in question. The policies may comprise, for example, a security policy, a QoS policy and/or any other suitable policy applicable to the service requested in the DNS request.

Additionally, or alternatively, the state information embedded in the service IP address may comprise routing information, which specifies how to route packets (pertaining to the overlay, the underlay or both) from the requesting client 28 to the server 32 that provides the requested service.

The embedded routing information may comprise, for example, a definition of the complete routing path from client 28 to server 32. The routing path may be specified, for example, as a list of POP nodes that should be traversed by the traffic from client 28 to server 32. Alternatively, any other suitable information, which is self-contained in specifying how to route packets from client 28 to server 32, can be embedded as routing information in the service IP address.

Additionally or alternatively, processor 44 may embed any other suitable type of state information, in the service IP address. Typically, processor 44 embeds the state information in spare bits of the service IP address. At a DNS response sending step 92, processor 44 sends to client 28 a DNS response that specifies the service IP address to the client.

At an overlay communication step 96, client 28 consumes the requested service by communicating with the appropriate server 32 over overlay system 20. As noted above, packets sent from client 28 to server 32 comprise the client IP address (assigned using the method of FIG. 2) as the source IP address, and the service IP address (assigned at steps 80-92 of FIG. 3) as the destination IP address. Similarly, packets sent from server 32 to client 28 comprise the client IP address (assigned using the method of FIG. 2) as the destination IP address, and the service IP address (assigned at steps 80-92 of FIG. 3) as the source IP address.

Based on the state information embedded in the client IP address and/or the service IP address, processors 44 of POP nodes 24 process the traffic between the client and the server in a fully stateless manner. For example, processors 44 may route the traffic between the client and the server in a stateless manner, because every packet carries the complete routing information embedded in the service IP address. As another example, processors 44 may apply security and/or QoS policies (specified for the client and/or for the service), in a stateless manner, because every packet carries the policy definitions embedded in the client IP address and/or service IP address.

Typically, client 28 is unaware of the fact that the client IP address and/or service IP address comprise embedded state information. Client 28 establishes the connection with the requested service, and subsequently communicates with the server, using conventional mechanisms and software. In addition, any router along the path sees regular IP addresses and routes them accordingly.

When using the disclosed techniques, server 32 communicates with a client IP address having the exact identity of the client (OPID) embedded therein. This identity-based communication enables system 20 to log and audit the connections.

System 20 is entirely stateless with regard to the data plane. There is no need to communicate with any external entity or service for performing data-plane decisions (e.g., enforcing routing, QoS and/or access control policies). All such decisions are carried out locally at the POP node level. In addition, if a POP node fails, the client will try to reconnect on its own initiative. The client will be connected to another, functional POP node, and continue operation (albeit with a different client IP address). For this process, too, no state synchronization of any kind is required. As a result, system 20 is highly scalable since there is no need to synchronize state information between PoPs/PoPAIs.

In some practical scenarios, it is necessary to modify the state information embedded in an IP address, after the IP address has been assigned. Modification of embedded state information may be needed, for example, following failure in the network (e.g., of a POP interface or network link) that calls for a change in routing policy, following an update of a policy, or for any other reason. In an example embodiment, processors 44 embed information regarding network failures in the IPv6 addresses, as part of the embedded state information. In an embodiment, following an update in a policy pertaining to a certain client, processors 44 actively disconnect the client, causing the client to re-connect on its own initiative. Upon re-connection, processors 44 assign the client a different IP address whose embedded state information reflects the updated policy. Such policy updates are typically assumed to be rare.

Example IP Address Structure

Figure 4:
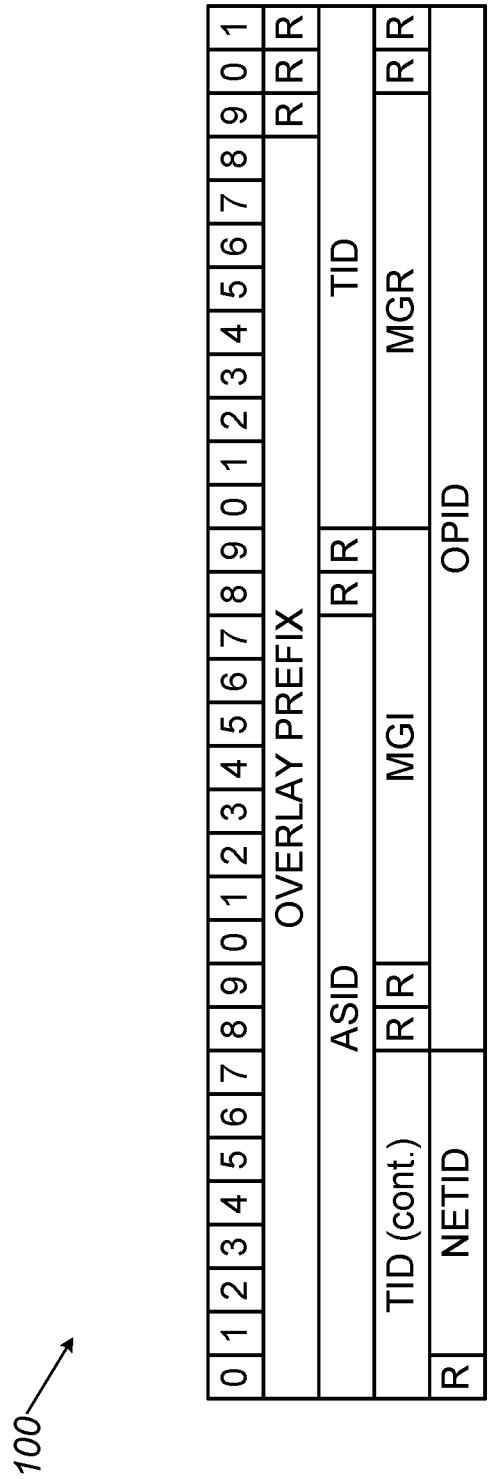
FIG. 4 is a diagram that schematically illustrates a structure of an IP address, in accordance with an embodiment of the present invention.

FIG. 4 is a diagram that schematically illustrates an example format 100 of an IP address, in accordance with an embodiment of the present invention. In some embodiments, processors 44 of system 20 use this format for assigning client IP addresses (e.g., at step 62 of FIG. 2) and/or service IP addresses (e.g., at step 92 of FIG. 3).

The present example pertains to IPv6, in which the IP address is 128-bit long. For convenience, the IP address is depicted in the figure as four 32-bit words. In accordance with format 100, each IP address comprises the following fields:

Overlay prefix: A 28-bit unique prefix that identifies the overlay network.

Access Server ID (ASID): an 18-bit value that specifies the individual access server associated with the client or service, as explained in detail below.

Tenant ID (TID): A 20-bit value that specifies the individual tenant from among multiple tenants served by the overlay network.

Initiator Meta-Group ID (MGI): A 10-bit value that specifies an initiator meta-group with which the packet is associated, as explained in detail below.

Responder Meta-Group ID (MGR): A 10-bit value that specifies a responder meta-group with which the packet is associated, as explained in detail below.

Network ID (NETID): A 7-bit value specifying the network portion of the overlay participant ID. In some embodiments NETID=0 for client/service participants having their own certificates, and is assigned a non-zero value for network participants.

Overlay Participant ID (OPID): A 24-bit value, explained above.

The above parameters embedded in the IP address, and the order in which they appear in the IP address, enable processors 44 to route the packets in a highly efficient, stateless manner.

Routing Among POPAIs Based on ASID

Figure 5:
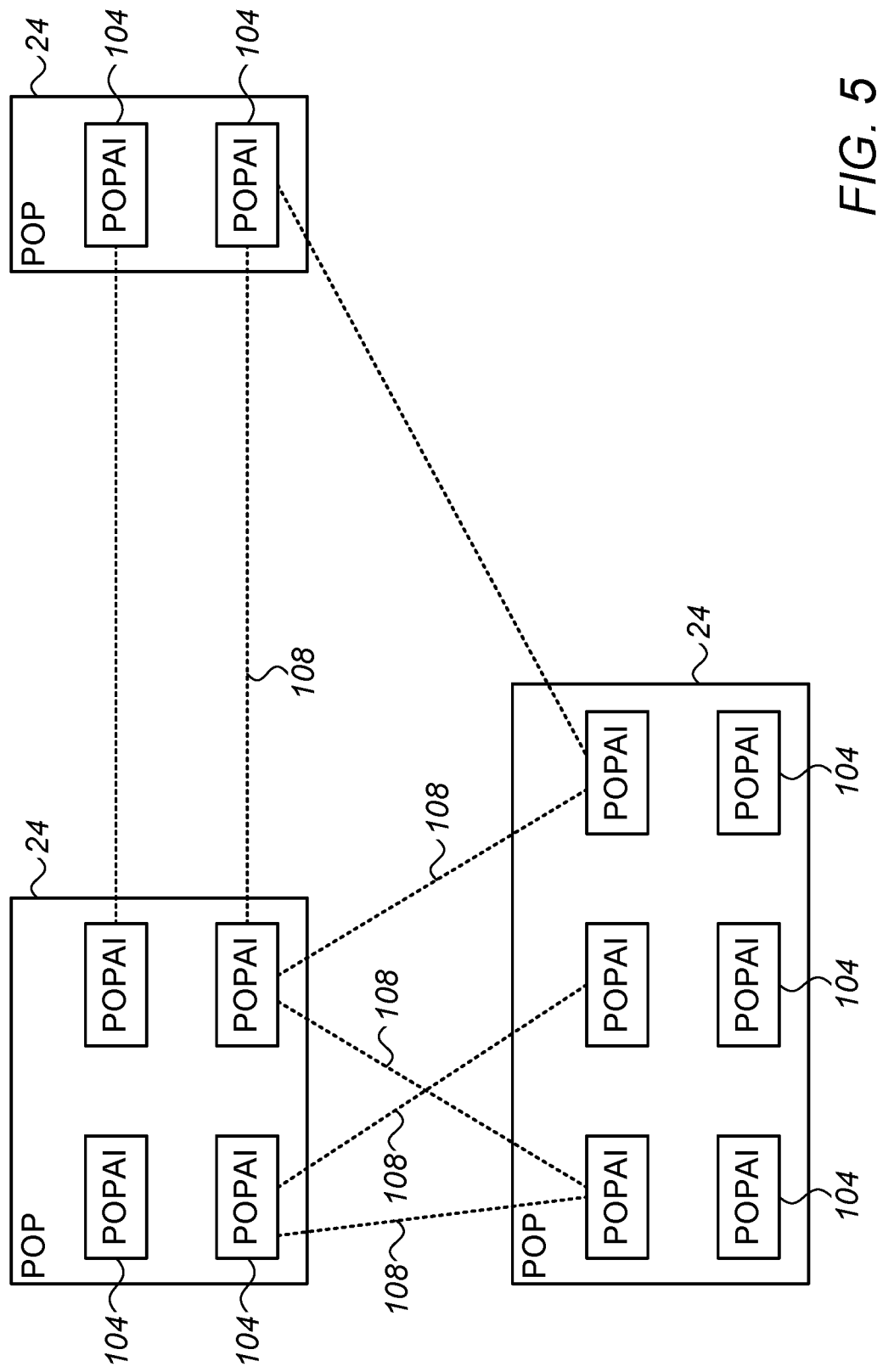
FIG. 5 is a block diagram that schematically illustrates Points-Of-Presence (POPs), POP Application Instances (POPAIs) and overlay interconnections in an Internet-wide secure overlay network, in accordance with an embodiment of the present invention.

FIG. 5 is a block diagram that schematically illustrates a portion of system 20 of FIG. 1, in accordance with an embodiment of the present invention. FIG. 5 shows three of POP nodes 24 (referred to simply as POPs) of system 20. POPs 24 are typically located in different geographical locations, globally, and each POP 24 is assigned to serve clients 28 and servers 32 in its respective geographical region.

In some embodiments, each POP 24 comprises one or more POP Access Instances (POPAIs) 104. Different POPs 24 may differ in the number, types and/or performance of the POPAIs they comprise. POPAIs 104 run on processors 44. Each POPAI 104 may comprise a physical machine or a virtual machine (VM), for example. Thus, any mapping of POPAIs to processors 44, often not a one-to-one mapping, can be used.

Among other tasks, POPAIs act as routers that receive and route packets in a stateless manner over the overlay network, using the techniques described herein. POPAIs 104 are also referred to herein as "access servers." Each POPAI is assigned a respective unique ASID (unique across the entire overlay network, not only within the POP).

In order to route packets from one POP 24 to another, inter-POP connections 108 are provisioned between the POPs. The inter-POP connections are also referred to herein as "tunnels." As can be seen in the example of FIG. 5, tunnels 108 are established directly between pairs of POPAIs 104, without any intervening load balancers or other centralized nodes in the POP. Moreover, typically, only selected pairs of POPAIs 104 are connected by tunnels 108. In other words, the set of tunnels 108 is typically much sparser than a full mesh. These points are addressed in greater detail below.

As noted above, in some embodiments each IP address has the corresponding ASID embedded therein. Each packet in the overlay network has a client IP address (with the ASID of POPAI 104 that serves that client) and a service IP address (with the ASID of POPAI 104 that serves that server).

Embedding the ASIDs as part of the IP addresses of the packets is advantageous for several reasons. For example, with this scheme, each packet conveys, as part of its IP addresses, the identities of the two POPAIs 104 at the beginning and end of its routing path. Therefore, each POPAI 104 is able to route the packet in a stateless manner, over the appropriate tunnel 108, based only on the self-contained information within the IP addresses in the packet. Routing of this sort is simple and does not require any complex computations such as using Routing Protocols like BGP to synchronize the routes between a large number of routers (as being done over the Internet).

As another example, by examining the ASIDs of the client and service IP addresses in a given packet, POPAIs 104 can immediately determine whether the client and server of the packet are connected to the same POP 24. In such a case, POPAIs 104 may route the packet locally within the POP, solely based on information conveyed in the packet itself.

Moreover, when using the disclosed techniques, packets are routed directly between POPAIs 104, without a need for any centralized entity within POP 24 that assigns flows or packets to POPAIs. No element of POP 24 needs to hold any data structure or perform any calculation for the sake of routing. As a result, scalability is increased, and mechanisms such as resilience and failure recovery are simplified.

Embedding the ADIDs in the packet IP addresses also enables processors 44 to apply a predefined "division of labor" among the multiple POPAIs 104 in a given POP 24. For example, in each POP 24, the IP address space may be divided among multiple POPAIs, such that each POPAI is assigned to process a predefined subset of the IP addresses. This assignment may be performed, for example, by a DNS server associated with the overlay network and implemented in one or more of the processors of system 20 (see, for example, the method of FIG. 3 above).

When using this implementation, packets can be routed between a pair of POPs 24 (each comprising multiple POPAIs) by provisioning connections 108 only between pairs of access servers assigned to same subsets of the IP address space. Without this mechanism, it would be necessary to provision connections 108 between all possible pairs of access servers in the two POP servers.

TID and Enterprise Sharding

In some embodiments, embedding the Tenant IDs (TIDs) as part of the IP addresses of the packets enables POPs 24 to apply various policies to the packets, depending on the identity of the tenant to which each packet belongs. As explained above, such policies may be set by a DNS server associated with the overlay network (see FIG. 3).

Some policies may specify separation between traffic of different tenants. For example, traffic of different tenants may be assigned to different POPAIs 104 and/or different inter-POP connections 108. This mechanism, too, is entirely stateless since each packet is routed automatically to the appropriate POPAI based only on its IP address (of which the TID is part).

Other policies may relate to load balancing among POPAIs 104 in a POP 24. In some embodiments, within a given POP 24, the tenants of the overlay network are assigned to POPAIs 104 in accordance with a certain mapping. The mapping may aim, for example, to distribute the traffic load evenly among the POPAIs. The mapping may differ from one POP 24 to another, e.g., since the volume of traffic per tenant may differ from POP to POP, and since the number and/or performance of POPAIs may differ from POP to POP.

In a simple example configuration, a certain POP 24 may comprise two POPAIs 104. The POP in question serves one large tenant that contributes 50% of the POP traffic, and multiple smaller tenants whose total traffic accumulates to the remaining 50%. In such a case it may make sense to assign one POPAI to handle the traffic of the large tenant, and assign the other POPAI to handle the traffic of the remaining tenants. Note that, since the TID is embedded as part of the IP address, any such assignment can be implemented by assigning different subsets of IP addresses to different POPAIs.

In addition to load balancing, assignment of tenants to POPAIs significantly reduces the number of inter-POP connections ("tunnels") 108. Consider a pair of POPs 24. If traffic of different tenants is handled by the POPAIs arbitrarily, then it is necessary to provision a tunnel 108 between every POPAI in the first POP and every POPAI in the second POP. When each tenant is handled by a specific POPAI, it is only necessary to provision tunnels between POPAIs that handle the same tenants. The number of tunnels 108 can therefore be reduced dramatically.

Example Enterprise Sharding Implementation

In an example embodiment, system 20 comprises a DNS server that is aware of the structure of the entire overlay network, e.g., the identities and locations of POPs 24 and the identities and capabilities of POPAIs 104 in each POP 24. Each POPAI has a unique IP address, e.g., within a subnet that is announced using Border Gateway Protocol (BGP), with or without anycast capabilities.

Clients 28 of the overlay network use a dedicated DNS requests of the form "clientid.tenantid.p.nsof.io" when issuing DNS requests to the DNS server. In the request, clientid denotes a unique ID of the client (corresponding to the OPID embedded in the IP address), and tenantid denotes a unique ID of the tenant to which the client belongs (corresponding to the TID embedded in the IP address). p.nsof.io denotes the DNS name, and can be replaced with any other valid public DNS name.

In response to such a DNS request from a client, the DNS server returns to the client a client IP address that, among other parameters, specifies the ASID, i.e., the POPAI that the client should connect to. It is important to note that the IP address specifies an individual POPAI 104, not a POP 24.

When specifying the POPAI, the DNS server takes into consideration the clientid and tenantid of the client. For example, the DNS server may assign tenants to POPAIs per POP 24, as explained above. The DNS server may thus return to the client a client IP address, in which the ASID specifies a POPAI assigned to the tenant to which the client belongs.

When deciding which POPAI the client should connect to, the DNS server may also consider factors such as the geographical location of the client, the current traffic load on the various POPAIs, available resources on the various POPAIs, and/or any other suitable consideration.

Typically, the above process can be carried out using conventional IPsec clients, without a need for any dedicated or modified agent or other software in clients 28.

In other embodiments, client 28 may include in the DNS request additional information ("hints") that assist the DNS server in assigning the POPAI. Such hints may comprise, for example, the type of client device (e.g., laptop or mobile phone), geo-location information obtained by the client, or any other suitable information.

The enterprise sharding information can be used by various server-side tools and protocols, such as ping, telnet or a Web browser, to essentially offload the load-balancing functionality to the DNS system.

MGI/MGR Mechanism

The MGI/MGR mechanism enables processors 44 to enforce security policies (e.g., security policies, access policies) on packets, without holding any matching tables or rule sets, and without a need to perform look-ups, evaluate rules or perform complex computations.

In some embodiments, the initiators in the overlay network are divided into initiator groups, wherein the initiators in each group are to be applied the same policy. Similarly, the responders in the overlay network are divided into responder groups, wherein the responders in each group are to be applied the same policy. In a typical client-server application, the initiators comprise clients 28 and the responders comprise servers 32. Generally, however, servers may also act as initiators and clients may also act as responders.

In an example embodiment, the initiator groups correspond to parts of an enterprise. For example, the clients belonging to the management of the enterprise may be associated with a certain initiator group, the clients belonging to the accounting department may be associated with a different initiator group, and the clients belonging to the R&D department may be associated with yet another initiator group.

In some embodiments, the initiator groups are clustered into initiator meta-groups, or "groups-of-groups." Each initiator meta-group comprises one or more initiator groups, and is assigned a unique Initiator Meta-Group ID (MGI). The responder groups are clustered into responder meta-groups. Each responder meta-group comprises one or more responder groups, and is assigned a unique Responder Meta-Group ID (MGR).

The initial definition of the initiator groups and responder groups, and their initial clustering into initiator meta-groups and responder meta-groups, are typically performed off-line during system provisioning. The group definition and/or clustering may be updated at any time, e.g., due to policy changes.

The objective of the grouping and meta-grouping process described above is to enable POP servers 24 to enforce policies in a stateless manner, without a need for holding data structures, evaluating rules or performing table look-ups. Enforcement of policy is based solely on the information embedded in the IP addresses of the packets being processed.

In some embodiments, the IP address of each packet specifies the corresponding MGI and MGR. For example, a client IP address of a packet sent from a client 28 to a server 32 specifies the MGI to which client 28 belongs. This MGI, as explained above, corresponds to the policy that should be applied to this client when acting as an initiator. As another example, the service IP address of a packet sent from a client 28 to a server 32 specifies the MGR to which server 32 belongs. This MGR, as explained above, corresponds to the policy that should be applied to this server when acting as a responder.

With the above mechanism, a processor 44 that processes packets is able to enforce a policy by performing one or more local, stateless, logical operations on the MGI of the initiator and the MGR of the responder. In a non-limiting example embodiment, the processor compares the MGI of the initiator and the MGR of the responder, e.g., by performing a logical AND between the MGI of the initiator and the MGR of the responder. If the MGI of the initiator and the MGR of the responder "logically match" from a policy perspective, processor 44 allows the initiator to access the service provided by the responder. If the MGI of the initiator and the MGR of the responder are "logically unmatched" from a policy perspective, processor 44 denies access to the service, e.g., by dropping the packets. Other forms of comparison between the MGI of the initiator and the MGR of the responder can also be used. In this manner, complex policies are enforced using a simple logical "matching" between portions of the IP address. Further alternatively, any other suitable type of local, stateless, logical operations can be used.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
multiple Point-of-Presence (POP) interfaces, which are distributed in a Wide-Area Network (WAN);
and one or more processors, which are coupled to the POP interfaces and are configured to:
assign, to an initiator in the system, a client Internet Protocol (IP) address having a first plurality of bits, including embedding in one or more of the bits of the client IP address;
an affiliation of the initiator with a group of initiators, wherein the affiliation of the initiator with the group of initiators comprises an Initiator Meta-Group ID (MGI) value indicative of the affiliation of the initiator, and
a Tenant ID (TIP) comprising a 20-bit value, different than the MGI value or a Responder Meta-Group ID (MGR) value, indicating an affiliation of each client with one or more organizations served by the system;
assign, to a responder in the system, a service IP address having a second plurality of bits, including embedding in one or more of the bits of the service IP address an affiliation of a service with a group of responders, wherein the affiliation of the service with the group of responders comprises the MGR value indicative of the affiliation of the responder;
route traffic between the initiator and the responder, over the WAN via one or more of the POP interfaces, in a stateless manner, based on the affiliation of the initiator and the affiliation of the service, as embedded in the bits of the client and service IP addresses, wherein the routing is performed based on the affiliation of the initiator and the affiliation of the service, as embedded in the bits of the client and service IP addresses;
receive a packet, which is exchanged between the initiator and the responder and which comprises the client IP address and the service IP address;
and enforce a security policy on the packet depending on the affiliation of the initiator and the affiliation of the service, as embedded in the client and service IP addresses, wherein enforcing the security policy comprises applying one or more stateless logical operations to the MGI of the initiator and to the MGR of the service, as embedded in the packet.

2. The system of claim 1, wherein:
routing of the traffic at the POP interfaces is performed by a plurality of access servers,
and the one or more processors are configured to assign the traffic of each of the one or more organizations to a subset of the plurality of access servers.

3. The system of claim 2, wherein:
a first POP interface corresponds to a first geographical location, and routing for the first POP interface is performed by a first subset of the plurality of access servers;
a second POP interface corresponds to a second geographical location, and routing for the second POP interface is performed by a second subset of the plurality of access servers;
and the one or more processors are configured to provision a set of inter-POP connections that is sparser than a full mesh between pairs of the access servers in the first subset of the plurality of access servers and the second subset of the plurality of access servers.

4. The system of claim 3, wherein assigning the client IP address comprises embedding, in the one or more bits of the client IP address, an Access Server ID (AS ID), and wherein the ASID comprises an 18-bit value, different than the MGI value, the MGR value, and the TID, that identifies one or more access servers associated with the initiator.

5. The system of claim 4, wherein the one or more processors are configured to receive a packet at the first POP interface of the POP interfaces, and to route the packet to the second POP interface of the POP interfaces by selecting an inter-POP connection for the packet based on the ASID.

6. The system of claim 5, wherein the one or more processors are configured to embed, in the one or more of the bits of the client IP address and the service IP address:
an Overlay prefix comprising a 28-bit prefix identifying an overlay network
a Network ID (NETID) comprising a 7-bit value specifying a network portion of an Overlay Participant ID (OPID), and
the OPID comprising a 24-bit value that is a fixed value unique across the system.

7. The system of claim 6, wherein the Overlay prefix, the ASID, the TID, the MGI, the MGR, the NETID, and the OPID are embedded into the bits of the client IP address and the service IP address in the following order: the Overlay prefix, the ASID, the TID, the MGI, the MGR, the NETID, and the OPID.

8. A method, comprising:
using one or more processors that are coupled to multiple Point-of-Presence (POP) interfaces distributed in a Wide-Area Network (WAN), assigning, to an initiator, a client Internet Protocol (IP) address having a first plurality of bits, including embedding in one or more of the bits of the client IP address;

an affiliation of the initiator with a group of initiators, wherein the affiliation of the initiator with the group of initiators comprises an Initiator Meta-Group ID (MGI) value indicative of the affiliation of the initiator, and a Tenant ID (TIP) comprising a 20-bit value, different than the MGI value or a Responder Meta-Group ID (MGR) value, indicating an affiliation of each client with one or more organizations served;

assigning, to a responder, a service IP address having a second plurality of bits, including embedding in one or more of the bits of the service IP address an affiliation of a service with a group of responders, wherein the affiliation of the service with the group of responders comprises the MGR value indicative of the affiliation of the responder;

routing traffic between the initiator and the responder, over the WAN via one or more of the POP interfaces, in a stateless manner, based on the affiliation of the initiator and the affiliation of the service, as embedded in the bits of the client and service IP addresses, wherein the routing is performed based on the affiliation of the initiator and the affiliation of the service, as embedded in the bits of the client and service IP addresses;

receiving a packet, which is exchanged between the initiator and the responder and which comprises the client IP address and the service IP address;

and enforcing a security policy on the packet depending on the affiliation of the initiator and the affiliation of the service, as embedded in the client and service IP addresses, wherein enforcing the security policy comprises applying one or more stateless logical operations to the MGI of the initiator and to the MGR of the service, as embedded in the packet.

9. The method of claim 8, wherein:

routing of the traffic at the POP interfaces is performed by a plurality of access servers, and the processors are configured to assign the traffic of each of the one or more organizations to a subset of the plurality of access servers.

10. The method of claim 9, wherein:

a first POP interface corresponds to a first geographical location, and routing for the first POP interface is performed by a first subset of the plurality of access servers;

a second POP interface corresponds to a second geographical location, and routing for the second POP interface is performed by a second subset of the plurality of access servers;

and the processors are configured to provision a set of inter-POP connections that is sparser than a full mesh between pairs of the access servers in the first subset of the plurality of access servers and the second subset of the plurality of access servers.

11. The method of claim 10, wherein assigning the client IP address comprising embedding, in the one or more bits of the client IP address, an Access Server ID (AS ID), and wherein the ASID comprises an 18-bit value, different than the MGI value, the MGR value, and the TID, that identifies one or more access servers associated with the initiator.

12. The method of claim 11, wherein the processors are configured to receive a packet at the first POP interface of the POP interfaces, and to route the packet to the second POP interface of the POP interfaces by selecting an inter-POP connection for the packet based on the AS ID.

13. The method of claim 12, wherein the processors are configured to embed, in the one or more of the bits of the client IP address and the service IP address:

an Overlay prefix comprising a 28-bit prefix identifying an overlay network a Network ID (NETID) comprising a 7-bit value specifying a network portion of an Overlay Participant ID (OPID), and OPID comprising a 24-bit value that is a fixed unique value.

14. The method of claim 13, wherein the Overlay prefix, the ASID, the TID, the MGI, the MGR, the NETID, and the OPID are embedded into the bits of the client IP address and the service IP address in the following order: the Overlay prefix, the ASID, the TID, the MGI, the MGR, the NETID, and the OPID.

* * * * *